United States Patent [19]
Redington et al.

[11] 3,820,873
[45] June 28, 1974

[54] SCREEN FOR PRODUCING AN ENHANCED IMPRESSION OF DEPTH

[75] Inventors: Rowland W. Redington, Schenectady; John L. Henkes, Jr., Loudonville, both of N.Y.

[73] Assignee: General Electric Company, Schenectady, N.Y.

[22] Filed: Apr. 26, 1973

[21] Appl. No.: 354,895

[52] U.S. Cl. .................. 350/125, 352/86, 353/7, 353/10
[51] Int. Cl. ........................................ G03b 21/56
[58] Field of Search ............... 350/125; 353/7, 10; 352/43, 61, 86

[56] References Cited
UNITED STATES PATENTS

| | | | |
|---|---|---|---|
| 3,292,491 | 12/1966 | Hourdiaux | 350/125 X |
| 3,311,017 | 3/1967 | Eckholm | 350/125 X |
| 3,372,971 | 3/1968 | Quackenbush et al. | 350/125 X |
| 3,420,605 | 1/1969 | Kipping | 350/125 X |

*Primary Examiner*—Samuel S. Matthews
*Assistant Examiner*—Richard A. Wintercorn
*Attorney, Agent, or Firm*—Paul F. Wille; Joseph T. Cohen; Jerome C. Squillaro

[57] ABSTRACT

An enhanced impression of depth is obtained from a projection screen having a concave surface formed by forward curving edges at the sides and bottom. The central portion of the screen is flat, or has a large radius of curvature, and the edges have a small radius of curvature. A section of the screen approximates the shape of an elongated ellipse, i.e. with major axes in the ratio of 8:1 or greater.

12 Claims, 7 Drawing Figures

PATENTED JUN 28 1974

SCREEN FOR PRODUCING AN ENHANCED IMPRESSION OF DEPTH

This invention relates to projection screens, and, in particular, to rear projection screens that produce an impression of depth in the two dimensional image projected thereon.

Prior attempts at producing an enhanced impression of depth have primarily related to motion picture theater systems. Wide screen techniques approach this result by supplying picture information to the peripheral vision. Outright steroscropic systems use special eyeglasses and pictures to supply separate information to the left and right eyes. None of these systems is readily adapted to hose use, nor is any compatible with a projection display of a standard commercial television picture.

Prior art attempts at producing the impression of depth in intermediate sized screens, such as in U.S. Pat. No. 2,542,789 — Ames — fail to produce adequate depth impression. Such a screen comprises a section of a toroid of special dimensions with the result that the screen has a fixed radius of curvature in the orthogonal planes from which the surface is defined. This type of surface produces a soft focus over all but the centralmost portion of the image and, hence, fails to adequately delocalize the image from the surface.

Binocular vision, while important for depth perception at fairly short distances, loses significance as the distance of the object increases. Other clues, such as relative sizes of known objects, perspective, obscuration, and atmospheric transmission are used by the viewer to produce a perception of a three-dimensional scene, absent conflicting stereoscopic information.

Due to these clues, distant scenes still retain a three-dimensional appearance, despite the fact that relative parallax information is much smaller than the visual acuity of the eye. To reproduce this appearance in a near image, it is necessary to delocalize the image from the screen surface so that objects in the reproduced scene appear to assume their natural sizes and positions.

Some delocalization takes place with very large pictures viewed from a distance or, for small pictures, with a lens to produce an enlarged, virtual image. Intermediate size pictures, such as television or home projection, are more difficult to delocalize.

In view of the foregoing, it is therefore an object of the present invention to provide an enhanced impression of depth in two dimensional images.

Another object of the present invention is to provide an improved projection screen.

A further object of the present invention is to provide a surface upon which two dimension images acquire a visual impression of depth.

Another object of the present invention is to provide an imaging surface upon which the image is delocalized from its surroundings and from the surface itself.

The foregoing objects are achieved in the present invention wherein there is provided a predominately flat, or substantially flat, surface having curved edges upon which the image is also projected. A cross-section of the surface approximates that of a flattened or elongated ellipse, i.e. the radius of curvature varies from very large, near the center of the surface, to small at the edges. In this embodiment, the edges curve toward the viewer (away from the rear projector). In an alternative embodiment, for front projection, the edges are stepped to improve the contrast near the edges. In another embodiment, also for front projection, the edges of the projection beam are intercepted to produce edge beams that are re-oriented so that they are incident approximately perpendicularly to the edges, i.e. closer to normal incidence.

A more complete understanding of the present invention can be obtained by considering the following detailed description in conjunction with the accompanying drawings, in which.

Figure 1:
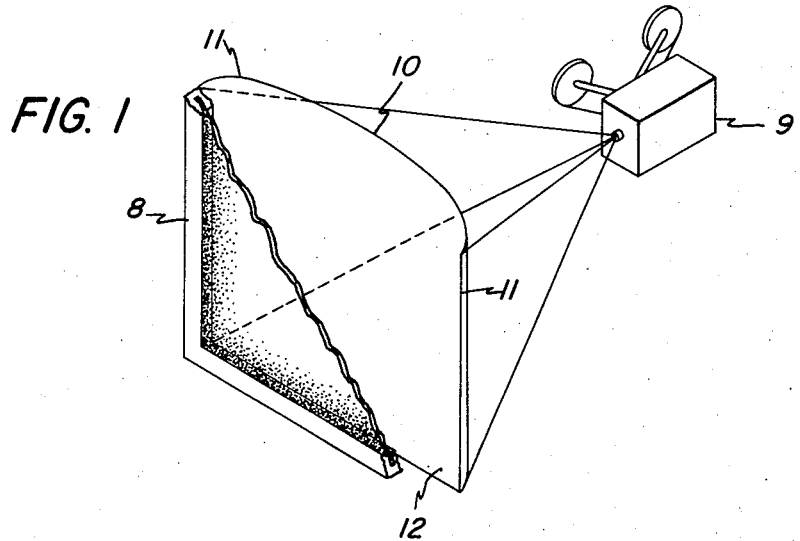
FIG. 1 illustrates a projection system in accordance with the present invention.

FIG. 1 illustrates a preferred embodiment of a rear projection system in accordance with the present invention in which the side and bottom edges of a substantially translucent screen 10 are curved in a direction away from projector 9. In general, the top edge of the screen is not curved, particularly where the majority of pictures that are to be projected onto screen 10 are outdoor scenes or indoor scenes with little or no ceiling visible. As will become more apparent, the use of a curved upper edge for these type scenes would provide a "tunnel effect" that is generally undesirable. Obviously, however, if desired, a removeable, curved section can be used for the top edge of screen 10, although it is preferred that the projection screen be seamless.

Screen 10 comprises an approximately flat central area occupying a 50–90 percent of the screen surface and edges 11 and 12 having a relatively short radius of curvature. The combination of an approximately flat surface and curved edges products a delocalization of the image that enables the eye to see the image itself but without an appreciation of the fact that it is projected upon a relatively near surface.

This delocalization may be further enhanced by utilizing a frame 7 around the front of the screen which slightly overlaps a portion of the screen, or by utilizing edge treatment 8 disclosed in U.S. Pat. No. 3,701,581 — Henkes, Jr. — in which the screen is framed by a border of varying opacity.

While vision and, particularly, binocular vision are not fully understood, either physiologically or psychologically, it is believed that the impression of depth is achieved in accordance with the present invention by freeing the image on the screen from its surroundings so that the projected image appears to be separated from the screen surface. Once this delocalization takes place, the mind of the viewer interprets the clues previously mentioned as a three dimensional image or scene.

Figure 2:
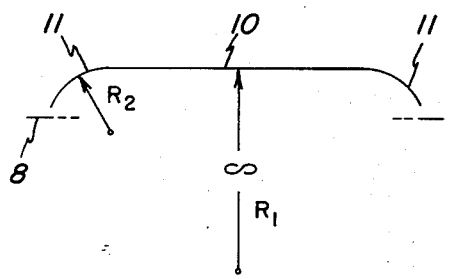
FIG. 2 illustrates a cross-section of the screen of FIG. 1.
Figure 3:
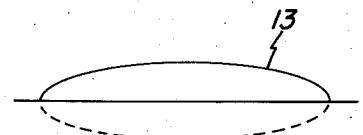
FIG. 3 illustrates an alternate cross-section of the embodiment of FIG. 1.
Figure 4:
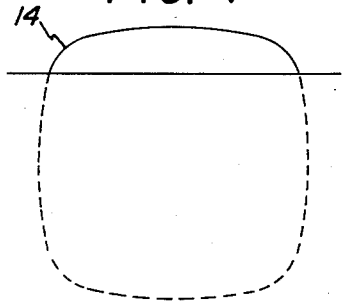
FIG. 4 illustrates another alternate of the embodiment of FIG. 1.

FIGS. 2–4 illustrate different curves representing cross-sections of screen 10 suitable for practicing the present invention. Specifically in FIG. 2 screen 10 comprises a flat central portion, the radius of curvature for which, $R_1$, is substantially infinite. Edges 11 of screen 10 comprise a smaller radius of curvature, $R_2$, which need not be uniform over the arc defining edges 11. While in the illustration FIG. 2, edges 11 may appear to be portions of a circle, that is, defined by a constant radius, such is not a preferred form of screen 10 since an abrupt change in radius of curvature may be detectable with certain types of images. In its preferred form, screen 10 comprises a substantially flat central portion with edges defined by a radius of curvature that is "feathered" into the straight, central portion.

The terms "large", "small", and "central", as used herein, are relative and are determined by the size of the screen. In general, the central portion of the screen comprises a distance of from 0.6 to 0.9 times the width of the screen. A large radius of curvature is from infinity down to approximately 8 or 10 times the width of the screen. A small radius of curvature is from the width of the screen down to approximately 1/10 of the width of the screen.

The screen illustrated in FIG. 1 is approximately square. For rectangular screens, the defining dimension is the longer of the two dimensions of the rectangle, provided that the screen is not inordinantly elongated. That is, projection screens, when rectangular, are typically in the ratio of from 3:5 to 4:5, height to width. Screens beyond approximately 1:5 fall into the category of wide screen projection systems noted above and are not amenable to the present invention, at least not at the sides.

FIG. 3 illustrates an alternate embodiment of the present invention wherein screen 13 is formed as a surface approximated by a section of an elongated ellipse. As with screen 10, the radius of curvature of screen 13 is very large in the central portion and small, relative to the screen dimension, at the edge portions. Such an elongated ellipse is formed when the axes of the ellipse are in the ratio of 8:1 or greater.

FIG. 4 illustrates another form of curve as may be used in defining the surface of the screen in which screen 14 comprises a section of one of a family or set of hypocycloids. As in connection with FIG. 2, the radius of curvature of the central portion of screen 14 is large and the edge portions of screen 14 have a radius of curvature that is small relative to the screen dimension.

Figure 5:
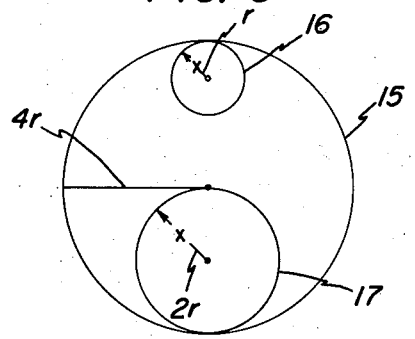
FIG. 5 illustrates how a hypocycloid is generated.

FIG. 5 illustrates how a hypocycloid is generated. As known, a hypocycloid is obtained by the rotation of a smaller circle in non-sliding contact on the inside of a larger circle. In particular, circle 15 having a radius $4r$ contains a circle 16 having a radius $r$. As circle 16 rotates within circle 15, in non-sliding contact therewith, a point on the circumference of circle 16 will trace out a square. A family of hypocycloids is obtained when tracing point $x$ lies on radius $r$ between (and not including) the center of circle 16 and its circumference. The curve traced by $x$ is what might be termed a soft square having non-straight edges and rounded corners.

Circle 17 is used to illustrate how an ellipse-like curve such as illustrated in FIG. 3 may be generated. As is known, a hypocycloid having circles whose radii are in the ratio of 2:1 is a straight line. However, by moving the curve tracing point $x$ to a point between the center of circle 17 and its circumference, the line assumes a two dimensional configuration.

The description of FIG. 5 as a mechanism for generating curves approximating the surface in accordance with the present invention should be construed as by way of example only and not as limitation. Other suitable curve generating apparatus may be utilized.

As illustrated in FIG. 1, screen 10 is preferably a rear projection screen, receiving an image from projector 9. If desired, a front projection screen may be used having the same shape as screen 10. Front projection, however, introduces some difficulties not encountered with rear projection.

Front projection results in loss of contrast and brightness in the edge regions, and also renders the edge treatment noted above more difficult to achieve. The loss of contrast results from light from other portions of the picture being reflected to the edge, while the loss of brightness results from the oblique incidence of the projected images combined with viewing from approximately the same angle. These difficulties are overcome by the modifications illustrated in FIGS. 6 and 7.

Figure 6:
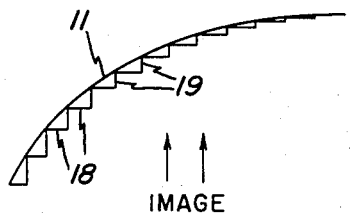
FIG. 6 illustrates an alternate edge for the surface.

FIG. 6 illustrates an alternative embodiment of the present invention wherein the edge portion is approximated by a series of steps. These steps or facets should not be so large as to be readily discernible and are preferably on the order of 10 to 100 mils per step. The facets do not affect picture quality and at the same time provide a marked improvement in edge contrast and brightness.

Edge portion 11 of screen 10 comprises a series of steps having a projection surface 18 and a riser surface 19. If desired, the riser surface 19 can be suitably treated to provide a lower reflectance than projection surface 18. Further, surface 18 of each step, while shown as orthogonal to the projection beam, may be inclined slightly to correspond to the curvature of edge 11; that is, surface 18 may be inclined depending upon the angle at which surface 18 "sees" the central portion of screen 10. Thus, the embodiment of FIG. 6 provides a discontinuous edge projection surface for the projected image. The discontinuities are not seen as such, however, and the overall effect is one of increased contrast and edge brightness as compared to that of a simple curved edge.

Figure 7:
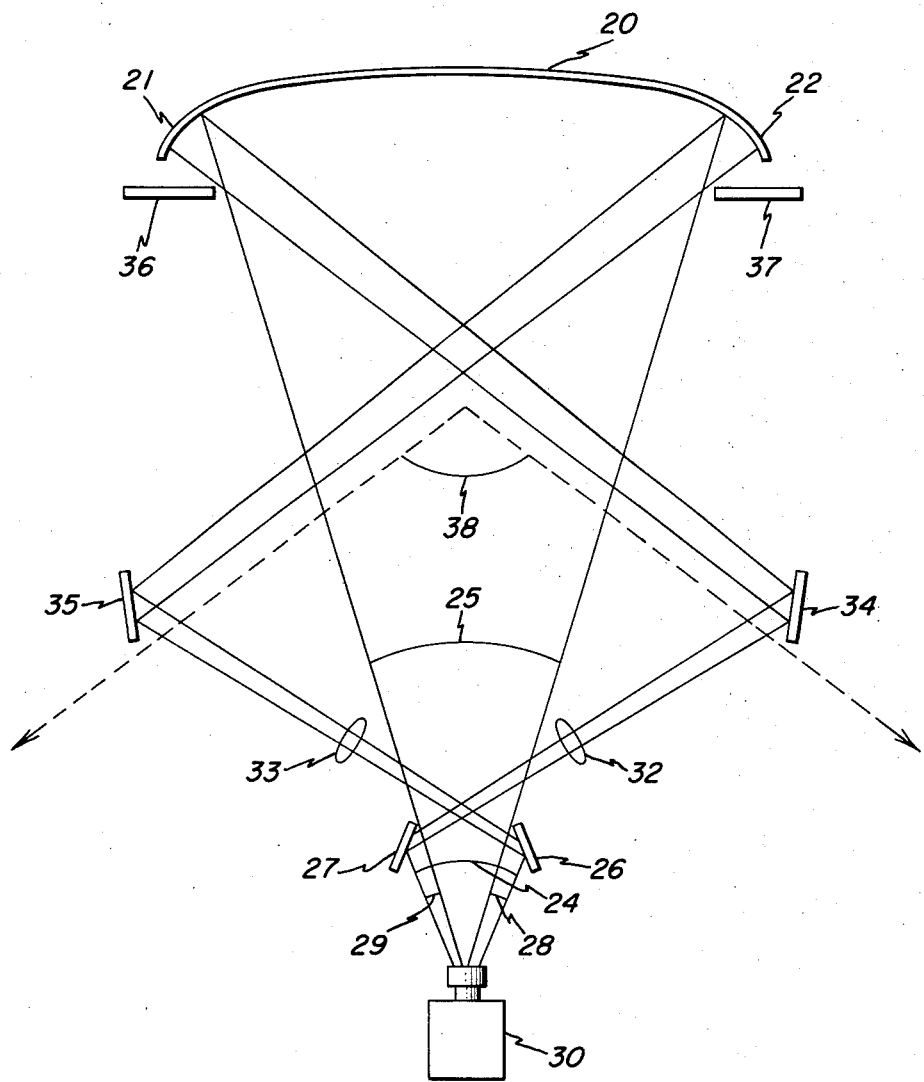
FIG. 7 illustrates an alternate system for projection at the edges.

FIG. 7 illustrates an alternative embodiment of the present invention wherein the front projection beam is split at the edges to provide separate edge beams for illuminating the curved portions of the projection screen. This enables the use of masks to block off a portion of the edge and provide the illusion of binocular vision by having each eye see a slightly different portion of the image.

Specifically, screen 20 having curved edges 21 and 22, which do not have the faceted or stepped surface illustrated in FIG. 6, receives a projected image from projector 30. Viewed as though from above, arc 24 of the projection beam is split by mirrors 26 and 27 into central beam 25 and edge beams 28 and 29. Edge beam 28 passes through beam path correction lens 33 and is reflected by mirror 35 onto edge portion 22. Similarly, edge beam 29 is reflected from mirror 27, passes through beam path correction lens 32 and is reflected from mirror 34 onto edge 21. In front of edges 21 and 22 are masks 36 and 37 respectively. Masks 36 and 37 shield edge portions 21 and 22 so that the view for each eye differs slightly, giving the impression of binocular vision. The beam paths taken by edge beams 28 and 29 intersect and define the maximum viewing angle 38 through which this impression is created.

The combination of curved edge screen 20 and the masks provide the illusion of binocular vision as well as the delocalization of the image so that it provides the visual impression of the original scene. Any loss of light due to the optics in illuminating edges 21 and 22 is not readily perceptable. Further, the vignetting produced by mirrors 26 and 27 makes the registration of images quite easy.

There is thus provided by the present invention an improved projection surface upon which two dimensional images produce the visual impression of depth. Further, the impression of depth is enhanced by the impression of binocular vision.

Having thus described the invention, it will be apparent to those of skill in the art that various modifications can be made within the spirit and scope of the present invention. For example, as previously noted, a curved upper edge is normally not necessary but may optionally be provided.

What we claim as new and desire to secure by Letters Patent of the United States is:

1. An improved surface for presenting two dimensional images with a visual impression of depth comprising:
   a image surface having a central portion and side and bottom edge portions;
   said central portion comprising from 50–90 percent of the total viewing area;
   said edge portions curving toward the viewer to produce a concave surface, and having a radius of curvature of from approximately 0.1 to 1.0 times the larger of the width or height dimensions of said surface; and
   said central portion having a radius of curvature in excess of ten times the smaller of said width or height dimensions.

2. An improved surface as set forth in claim 1 wherein the radius of curvature of said central portion is substantially infinite.

3. An improved surface as set forth in claim 1 wherein the radii of curvature of said central and edge portions vary along each of said dimensions of said surface to provide a smooth curve.

4. An improved surface as set forth in claim 3 wherein said curve forms an elongated ellipse.

5. An improved surface as set forth in claim 3 wherein said curve forms a hypocycloid.

6. An improved surface as set forth in claim 5 wherein said hypocycloid is one of a family defined by two circles having radii in the ratio of 4:1.

7. An improved surface as set forth in claim 1 wherein said surface forms a rear projection surface.

8. An improved surface as set forth in claim 1 wherein said surface forms a front projection surface.

9. An improved surface as set forth in claim 8 wherein said surface is discontinuous in said edge portions.

10. An improved surface as set forth in claim 9 wherein said edge portions are faceted.

11. An improved front projection system for viewing two dimensional images comprising:
    a projection screen having a central portion, comprising 50–90 percent of the total viewing area, and edge portions curving toward the viewer to produce a concave surface; said edge portions having a radius of curvature of from approximately 0.1 to 1.0 times the larger of the width or height dimensions of said screen, and said central portion having a radius of curvature greater than ten times the smaller of said dimensions;
    a projector positioned in front of said screen for causing a projection beam to be incident upon said screen; and
    beam splitting means, intercepting the edges of said projection beam to form edge beams, for re-orienting said edge beams approximately perpendicular to said edge portions of said projection screen.

12. An improved projection system as set forth in claim 11 wherein said beam splitting comprises:
    mirror means, intercepting the edge of said projection beam, for re-orienting the direction of said edge beams; and
    beam path correction means for focusing said edge beams on the edge portions of said projection screen.

* * * * *